United States Patent
Quinn et al.

(10) Patent No.: US 11,905,358 B2
(45) Date of Patent: Feb. 20, 2024

(54) HIGHLY FILLED URETHANE MATERIALS AND METHODS OF MAKING

(71) Applicant: STOCKMEIER URETHANES USA, INC., Clarksburg, WV (US)

(72) Inventors: Michael Hugh Quinn, Morgantown, WV (US); Gabrielle Lynn Hamner, Bridgeport, WV (US)

(73) Assignee: STOCKMEIER URETHANES USA, INC., Clarksburg, WV (US)

( * ) Notice: Subject to any disclaimer, the term of this patent is extended or adjusted under 35 U.S.C. 154(b) by 257 days.

(21) Appl. No.: 17/097,025

(22) Filed: Nov. 13, 2020

(65) Prior Publication Data
US 2021/0147608 A1 May 20, 2021

Related U.S. Application Data

(60) Provisional application No. 62/935,258, filed on Nov. 14, 2019.

(51) Int. Cl.
| | |
|---|---|
| *C08K 3/34* | (2006.01) |
| *C08G 18/48* | (2006.01) |
| *C08K 3/26* | (2006.01) |
| *C08G 18/12* | (2006.01) |
| *C08G 18/76* | (2006.01) |

(52) U.S. Cl.
CPC ........... *C08G 18/485* (2013.01); *C08G 18/12* (2013.01); *C08G 18/4829* (2013.01); *C08G 18/7671* (2013.01); *C08K 3/26* (2013.01); *C08K 3/34* (2013.01); *C08K 2003/265* (2013.01)

(58) Field of Classification Search
CPC ...... C08K 3/26; C08K 3/34; C08K 2003/265; C08K 3/346; C08G 18/485; C08G 18/12; C08G 18/4829; C08G 18/7671; C08G 18/758; C08L 75/04; C09D 175/04
USPC .......................................................... 524/451
See application file for complete search history.

(56) References Cited

U.S. PATENT DOCUMENTS

2006/0135636 A1* 6/2006 Zhu .................... C08G 18/4018
                                                                521/172
2016/0369080 A1* 12/2016 Crocco ................ C08K 11/005

* cited by examiner

*Primary Examiner* — Hannah J Pak
(74) *Attorney, Agent, or Firm* — Carol A. Marmo; Eckert Seamans Cherin & Mellott, LLC

(57) ABSTRACT

The invention relates to highly filled urethane systems, methods of making the urethane systems, and their use in commercial applications. More particularly, the invention includes urethane systems with a substantial amount of mineral filler that have acceptable cure kinetics and mechanical properties. The urethane systems include an isocyanate component, a polyol component, and a mineral filler that, in certain embodiments, is selected from talc, mica, calcium carbonate and mixtures or blends thereof.

7 Claims, 1 Drawing Sheet

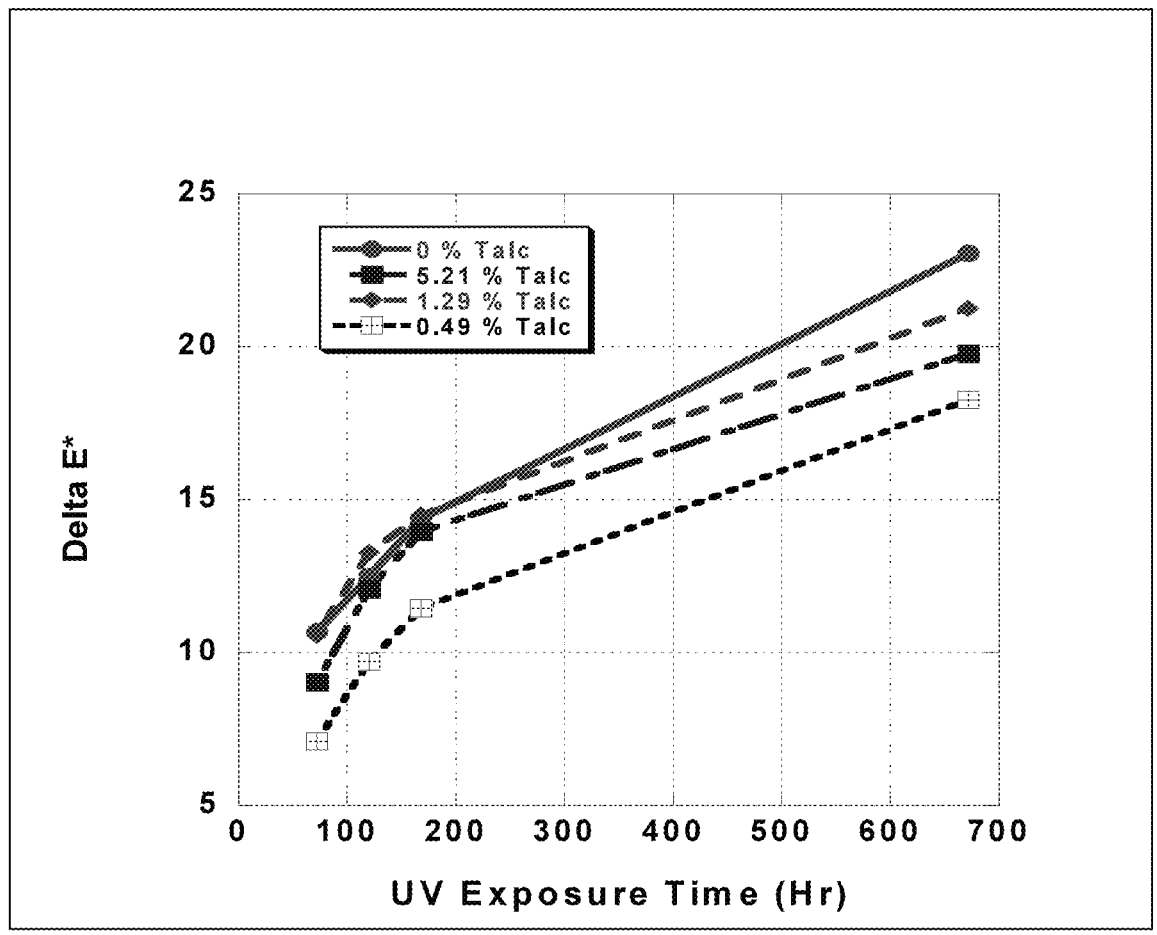

HIGHLY FILLED URETHANE MATERIALS AND METHODS OF MAKING

CROSS-REFERENCE TO RELATED APPLICATIONS

This application claims priority under 35 U.S.C. § 119(e) from U.S. provisional patent application No. 62/935,258, entitled "HIGHLY FILLED URETHANE MATERIALS AND METHODS OF MAKING," filed on Nov. 14, 2019, the content of which is incorporated herein by reference.

FIELD OF THE INVENTION

The invention relates to highly filled urethane materials, methods of making these materials, and their use in commercial applications. More particularly, the invention includes polyurethanes with a substantial amount of mineral filler that have acceptable cure kinetics and mechanical properties.

BACKGROUND

Urethane systems containing fillers are known in the art. Polyurethanes are generally foams or elastomers. Polyurethanes are typically formed by the reaction of isocyanate and polyol. Including filler into polyurethanes prior to urethane formation is challenging, due in part to the high viscosity that results upon addition of the filler to the polyol.

Mineral fillers serve, at least in part, to decrease the cost of the polyurethane by displacing polyurethane with less expensive filler. It is preferable to include as much mineral filler as possible without having a significant detrimental effect on the properties of the polyurethane. Suitable mineral fillers include inorganic minerals of various types that are included within the polyurethane without adverse effects on the polyurethane itself, and in some instances with beneficial effects on the properties of the polyurethane. The fillers in conventional highly filled urethanes constitute between about 35 and about 95% of the total weight of the urethane systems. Achieving this high level of fillers while maintaining acceptable cure kinetics and mechanical properties of the urethane systems is challenging. It is typical for constraints and precautions to be associated with their preparation.

Calcium carbonate is a widely used mineral filler because it is inexpensive and capable of being used at high loadings. It is generally used as an extender, however, it improves stiffness and impact strength, as well as provides high brightness and gloss. There are also known disadvantages of calcium carbonate, such as, lowered tensile strength and compressive strength, greatly reduced elongation, and low resistance to organic acids.

Thus, there is a need in the art to develop highly filled urethane systems and methods of making that do not require constraints and precautions. Furthermore, it would be advantageous to develop systems and methods that permit the use of calcium carbonate pigments, but do not exhibit the disadvantages historically associated therewith.

SUMMARY OF THE INVENTION

In one aspect, the invention provides a highly filled urethane system including an isocyanate component; a polyol component; and a mineral filler selected from the group consisting of talc, mica, calcium carbonate and combinations thereof.

The mineral filler can be selected from the group consisting of talc, mica and combinations thereof, and the mineral filler can constitute from greater than 0 to less than about 50% by weight of the urethane. The mineral filler can consist of calcium carbonate and one or more of talc and mica, and the talc and/or mica can constitute a total amount from greater than 0 to less than about 40% by weight of the urethane.

The urethane system can further include additives selected from the group consisting of catalyst, UV protection additive, colorant, pigment, antioxidant and mixtures thereof.

The isocyanate component can be selected from the group consisting of isophorone diisocyanate, hexamethylene diisocyanate, methylenebis(phenyl diisocyanate), monomeric cycloaliphatic isocyanate, 4,4'-methylene dicyclohexyl diisocyanate, monomeric cycloaliphatic isocyanate, polymeric MDI, and mixtures and blends thereof.

The polyol component can be selected from the group consisting of alkylene glycols, ethylene glycol, propylene glycol, 1,4-butane diol, 1,6 hexanediol, glycol ethers and polyethers, difunctional polyether polyols, diethylene glycol, triethylene glycol, dipropylene glycol, tripropylene glycol, glycerine, trimethylolpropane, tertiary amine-containing polyols, triethanolamine, triisopropanolamine, and ethylene oxide and/or propylene oxide adducts of ethylene diamine, toluene diamine, polyether polyols, carbonates, and mixtures and blends thereof.

The urethane system can have an isocyanate index from about 1.04 to about 1.15. The urethane system can have a percent NCO from about 12.50 to about 25.22 percent.

The mineral filler can be in the form of a composition or formulation including a polyol.

In certain embodiments, the mineral filler is talc, the urethane system has an NCO:OH index of about 1.15, and said urethane system exhibits improved stability to UV exposure.

In another aspect, the invention provides a method of preparing a highly filled urethane system. The method includes selecting an isocyanate component; selecting a polyol component; selecting a mineral filler; adding the mineral filler to one or both of the isocyanate and polyol components; reacting the isocyanate component with the polyol component; and forming the highly filled urethane system.

In certain embodiments, the mineral filler is added to the isocyanate component only. In other embodiments, the mineral filler is added to the polyol component only.

The mineral filler can be added to a polyol that is separate from the polyol component, prior to adding the mineral filler to one or both of the polyol component and the isocyanate component.

BRIEF DESCRIPTION OF THE DRAWINGS

A full understanding of the disclosed concept can be gained from the following description of the preferred embodiments when read in conjunction with the accompanying drawing.

FIG. 1 is a plot that shows the difference in degradation from exposure to UV radiation between a control sample with no talc and test samples containing various levels of talc. Each of the first, second and third test samples had lower $\Delta E^*$ values with increased UV exposure times as compared to the $\Delta E^*$ values of the control sample at the

DETAILED DESCRIPTION OF PREFERRED EMBODIMENTS

The invention relates to highly filled urethane systems, such as polyurethane systems, including a two component system (isocyanate and polyol), with an amount, e.g., a substantial amount, of filler. These urethane systems demonstrate acceptable cure kinetics and mechanical properties for a wide variety of commercial applications.

As used herein and the claims, the term "highly filled urethane system(s)" means urethane systems(s) wherein filler constitutes from about 35% to about 95% of the total weight of the urethane system.

In certain embodiments of the invention, the urethane systems are prepared by reacting a first component isocyanate, e.g., diisocyanate, with a second component polyol, e.g., difunctional polyol, to form an isocyanate-terminated prepolymer. In other embodiments of the invention, the urethane systems are prepared by directly reacting an isocyanate component with a polyol component without forming a pre-polymer in an intermediate step. Suitable diisocyanates include those known for use in preparing urethane systems, e.g., polyurethane systems, such as aromatic, aliphatic and cycloaliphatic polyisocyanates, for example, isophorone diisocyanate (IPDI), hexamethylene diisocyanate (HDI), methylenebis(phenyl diisocyanate) (MDI), 4,4'-methylene dicyclohexyl diisocyanate ($H_{12}$MDI), monomeric cycloaliphatic isocyante commercially available under the trade name Desmodur™ W, m-phenylene diisocyanate, 2,4- and/or 2,6-toluene diisocyanate (TDI), hexamethylene 1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4''-triphenylmethane diisocyanate, polymethylene polyphenylisocyanate, toluene-2,4,6-trilsocyanate, and 4,4'-dimethyldiphenylmethane-2,2',5,5'-tetraisocyanate and polymeric MDI such as Voranate™ M220 from Dow, as well as mixtures and blends thereof.

Preferred polyisocyanates include isophorone diisocyanate (IPDI), hexamethylene diisocyanate (HDI), methylenebis(phenyl diisocyanate), such as 4,4'-methylene dicyclohexyl diisocyanate ($H_{12}$MDI), monomeric cycloaliphatic isocyanate that is commercially available under the trade name Desmodur™ W, polymeric MDI and mixtures and blends thereof.

In certain embodiments, the percent NCO in the urethane systems, e.g., pre-polymer, is from greater than 0 to about 31.8%. At the lower end of the range, the viscosity increases and the urethane systems, e.g., prepolymer, is difficult to pour or unpourable. In certain other embodiments, the percent NCO is from about 12.50 to about 25.22%. Furthermore, in certain embodiments, the resulting urethane systems, e.g., prepolymer, contains about 18.5 percent isocyanate functional groups.

Suitable polyols include compounds such as alkylene glycols (e.g., ethylene glycol, propylene glycol, 1,4-butane diol, 1,6 hexanediol and the like), glycol ethers and polyethers, for example difunctional polyether polyols, such as diethylene glycol, triethylene glycol, dipropylene glycol, tripropylene glycol and the like, glycerine, trimethylolpropane, tertiary amine-containing polyols such as triethanolamine, triisopropanolamine, and ethylene oxide and/or propylene oxide adducts of ethylene diamine, toluene diamine and the like, polyether polyols, carbonates and the like, and mixtures and blends thereof. Polyester polyols are also suitable including reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid.

Preferred examples of suitable polyols are difunctional polyether polyols containing primary hydroxyl groups, such as that commercially available under the trade name Lupranol™ 2043, polyether triol, such as that commercially available under the trade name Voranol™ CP 4655, and mixtures and blends thereof.

The amount of the isocyanate and polyol in the urethane systems varies. The ratio of the two components is selected such as to provide an isocyanate index (ratio of isocyanate to isocyanate-reactive groups, e.g., hydroxyl (OH), of the polyol). In certain embodiments, the isocyanate and polyol components are formulated such that the isocyanate index is achieved using comparable volumes of each component. The index of isocyanate to hydroxyl (NCO:OH) equivalents is from about 1.04 to about 1.15 and, in preferred embodiments, the NCO:OH index is about 1.15.

In addition to the two-component system, i.e., isocyanate and polyol, the urethane systems include a filler, such as a mineral filler. The filler is present in one or both of the isocyanate component and the polyol component. In one embodiment, the mineral filler is added only to the polyol component before mixing. In another embodiment, the mineral filler is added to only the isocyanate component before mixing. In a further embodiment, the mineral filler is added to both the polyol component and the isocyanate component before mixing. The mineral filler is incorporated into the polyol component or the isocyanate component by conventional techniques, such as mechanical stirring. Furthermore, in certain embodiments, the filler is added to a polyol other than (separate from) the polyol component of the urethane system, to form a filler formulation or composition. The polyol in the filler formulation or composition is the same or different than the polyol component of the urethane system. The filler formulation or composition is subsequently mixed with the isocyanate component and/or polyol component. For example, the mineral filler is added to a polyol triol to form a filler formulation and this filler formulation is subsequently added to the isocyanate component and/or polyol component of the urethane system. Adding the mineral filler to a separate polyol and/or the polyol component of the urethane system results in a rapid increase in viscosity. Incorporation of the filler into the isocyanate component, however, results in a less rapid rise in viscosity as a function of filler loading. Furthermore, when the ratio of the isocyanate to the other reactive component(s) is greater than 1, i.e., more isocyanate is present than other reactive component(s), the weight percent of filler in isocyanate component will be decreased relative to filler added to polyol component for the same weight percent filler in the final filled urethane system. Further, if there are additional reactive components present in the reaction mixture that react with the isocyanate component, incorporation of the filler into the isocyanate component in these instances further reduces the filler loading relative to any of these additional reactive components.

Various fillers are known in the art for producing the filled urethane systems. Suitable fillers for use in the invention are selected from those that are known. Calcium carbonate is a suitable mineral filler. Historically, the use of calcium carbonate to produce a highly filled urethane system requires special precautions and constraints during preparation. However, the present invention provides a method of preparing a highly filled urethane system that does not require such special precautions and constraints. It has been found that the use of talc and/or mica itself (absent of calcium carbonate) or combined with calcium carbonate as the filler provides a highly filled urethane system that is prepared absent of special precautions and constraints. Various grades of talc are known in the art. Talc is commercially available under the trade names Vantalc™ 40-27 and Vantalc™ 15-38. The amount of talc and/or mica varies and typically, is selected based on the amount that produces a formulation that is not too thick, e.g., viscous, such that the formulation is flowable and of a consistency that is appropriately mixed and cured. In certain embodiments, mica is used partially or fully in place of talc. The mica is used to supplement the talc or replace the talc.

In certain embodiments, the talc and/or mica is used and the highly filled urethane system is absent of calcium carbonate. In other embodiments, the talc and/or mica is used in combination with calcium carbonate and/or like fillers. These like fillers are selected from those that are conventionally used to prepare highly filled urethane systems. Wherein talc and/or mica is used absent of calcium carbonate or other like fillers, the talc and/or mica is present in a total amount from greater than 0 to about 40% or from greater than 0 to about 50% or from greater than 0 to about 56%, by weight of the urethane system. In certain embodiments, talc and/or mica is present in a total amount from greater than 0 to less than about 56% or from greater than 0 to less than about 50% or from about 40% to less than about 56% or from about 40% to less than about 50%, by weight of the urethane system, to provide a product having desired properties and characteristics.

In certain other embodiments, wherein talc and/or mica is used in combination with calcium carbonate or like fillers, the talc and/or mica is present in a total amount from greater than 0 to less than about 40% or from greater than 0 to less than about 15% or from about 2% to about 30% or from about 10% to about 30% or from about 2% to about 13%, by weight of the urethane system. Further, the ratio of the weight of talc and/or mica in total to calcium carbonate or like fillers, in certain embodiments, is from about 2:51.1 to about 12.8:40.3 or from about 1.9:49.1 to about 13:40.8. In certain embodiments, wherein talc and/or mica and calcium carbonate are used in combination, talc and/mica is present in a total amount from about 3% to 24% and calcium carbonate is present in an amount from about 76% to about 97%, based on total weight of the talc and/or mica and calcium carbonate. Furthermore, in certain embodiments, the talc and/or mica and calcium carbonate is present in a total amount of from about 51% to about 54% or from about 52% to about 53%, by weight of the urethane system.

In addition to the foregoing components (isocyanate, polyol and mineral filler), other conventional additives are optionally used to produce the highly filled urethane systems, such as but not limited to, catalyst, UV protection additive, water-removing additive, colorant/pigment, antioxidant and mixtures thereof. The reaction of the isocyanate and polyol is typically facilitated by a catalyst. Suitable catalysts are known to those skilled in the art, and include the general classes of amine compounds and organometallic complexes. Non-limiting examples of suitable catalysts include dibutyltin dilaurate, dimethyltin dineodecanoate (commercially available under the trade name UL-28™), 2,4,6-tris(diaminomethyl)phenol (a tertiary amine commercially available under the trade name A575), 1,8-diazabicycloundecene (commercially available under the trade name DBU™) and organo-metallic compounds (commercially available under the trade name Coscat™ 8330R).

Additionally, surfactants are optionally used in the foregoing components to modify the characteristics of the filled urethane system. The surfactants function to emulsify the liquid components. Examples of surfactants include polydimethylsuloxane-polyoxyalkylene block copolymers, nonylphenol ethoxylates, alkylene adducts of ethylene diamine, and polyoxyalkylene esters of long chain fatty acids and sorbitan.

The inventors have shown that the urethane systems of the invention exhibit improved stability to UV exposure, as compared to urethane systems that do not include the presence of talc and/or mica as filler. In certain embodiments, the mineral filler includes talc and/or mica, the urethane system has an NCO:OH index of about 1.15, and said urethane system exhibits improved stability to UV exposure. In certain embodiments, the talc and/or mica is present in a total amount greater than 0 or from greater than 0 to about 0.5% or from greater than 0 to about 5.2% or from about 0.49% to about 5.21%, by weight of the urethane system. Further, FIG. 1 is a plot that shows the difference in degradation from exposure to UV radiation between a control sample with no talc and test samples containing various levels of talc. Each of the first, second and third test samples had lower ΔE* values with increased UV exposure times as compared to the ΔE* values of the control sample at the increased UV exposure time.

It should be understood that the embodiments described herein and the examples provided below are for illustrative purposes only and that various modifications or changes in light thereof will be suggested to persons skilled in the art and are to be included within the spirit and purview of this application.

EXAMPLES

Example 1

The mineral filler formulations shown below in Table 1, including polyether triol with talc, calcium carbonate or a mixture thereof, were prepared by combining the listed ingredients in the indicated amounts.

TABLE 1

| Ingredients | Formulas | | | |
| --- | --- | --- | --- | --- |
| | 1 | 2 | 3 | 4 |
| Voranol CP 4655* | 39.19 | 39.19 | 67.23 | 39.19 |
| Calcium Carbonate* | 56.07 | 0 | 0 | 42.07 |
| Talc* | 0 | 56.07 | 28.04 | 14.00 |
| Molecular Sieve 3A* | 2.86 | 2.86 | 2.86 | 2.86 |
| Iron Oxide Red* | 1.83 | 1.83 | 1.83 | 1.83 |

TABLE 1-continued

| | Formulas | | | |
|---|---|---|---|---|
| Ingredients | 1 | 2 | 3 | 4 |
| Dibutyltin Dilaurate* | 0.05 | 0.05 | 0.05 | 0.05 |
| Cure Temp. (° C.) | 110 | 0 | 50 | 50 |
| Cure Time (hrs.) | 1 | 0 | 3 | 3 |
| Result | Poorly Cured | Not Mixable | Good Cure | Good Cure |

*Indicates percentage (%)

In all formulations, the prepolymer was made by reacting diisocyanate H12MDI with difunctional polyol Lupranol 2043. The percent isocyanate of the resultant prepolymer was about 18.5%. The index of isocyanate to hydroxyl equivalents was about 1.06. When the prepolymer was mixed, both components were at a temperature of 20° C.

Formula 1 included calcium carbonate as filler, in the absence of talc (without talc). Formulas 2 and 3 included talc as filler, in the absence of calcium carbonate (without calcium carbonate). Formula 4 included a combination of talc and calcium carbonate. In general, the results for Formulas 1 and 2 showed that the use of only calcium carbonate and only talc at 56.07%, respectively, produced poorly cured and non-mixable/non-flowable materials, respectively. However, the use of only the talc filler at a lower concentration of 28.04% in Formula 3, resulted in a good cured material, and the use of the calcium carbonate and talc fillers in combination at a total concentration of 56.07% in Formula 4 resulted in a good cured material as well.

For Formula 1, the material could not be cured at any temperature below 110° C. Different catalysts were used, including UL-28, A575, DBU and Coscat 8330R. None of them resulted in properly curing the material below 110° C. The bottom of a cast plaque (which was about 3 mm thick) cured, but the top did not cure (even after at least two days at 110° C.).

In Formula 3, the amount of the talc, i.e., 28.04%, was at a lower concentration than desired for the final filled urethane product. However, the resulting material was acceptable after a cure at 50° C. for about three hours. Both Vantalc 40-27 and Vantalc 15-38 were tested as different grades of talc. The Vantalc 40-27 cured about an hour faster than the Vantalc 15-38.

Example 2

The experimental design used in this example is shown in Table 2.1 below. The independent variables were (i) NCO % of the prepolymers used, (ii) NCO/OH index, and (iii) ratio of calcium carbonate to talc (total filler is about 52%).

TABLE 2.1

| Experimental Design | | | |
|---|---|---|---|
| Run | NCO (%) | NCO/OH | Ratio* |
| 1 | 25.22 | 1.15 | 40.3/12.8 |
| 2 | 25.22 | 1.15 | 51.1/2 |
| 3 | 25.22 | 1.04 | 40.3/12.8 |
| 4 | 25.22 | 1.04 | 51.1/2 |
| 5 | 12.50 | 1.15 | 40.3/12.8 |
| 6 | 12.50 | 1.15 | 51.1/2 |
| 7 | 12.50 | 1.04 | 40.3/12.8 |
| 8 | 12.50 | 1.04 | 51.1/2 |
| 9 | 18.59 | 1.09 | 45.7/7.42 |

*Weight calcium carbonate to talc in total formulation

The components used to make the prepolymers are shown in Table 2.2 below.

TABLE 2.2

| Prepolymer Formulations | | | |
|---|---|---|---|
| Prepolymer | 1 | 2 | 3 |
| Desmodur W | 80.0 | 62.42 | 42.86 |
| Polyol 06 | 19.95 | 37.53 | 57.10 |
| DBTDL | 0.05 | 0.05 | 0.05 |
| NCO (%) | 25.14 | 18.59 | 12.32 |

Heated at 75° C. for 18 hours

The test formulations are shown below in Table 2.3. For ease of comparison, the prepolymers are represented as their constituents. The formulations included a total amount of calcium carbonate and/or talc of about 52%, and total solids was about 58%. Formula 9 was subsequently modified by increasing the total amount of pigment to 65 and to 75 percent of the total weight. The calcium carbonate/talc ratio was about 51/1. However, these formulations with increased pigment could not be made because the amount of Polyol 02 was not sufficient to make a slurry.

TABLE 2.3

| Experimental Design Actual Values | | | | | | | | | |
|---|---|---|---|---|---|---|---|---|---|
| Ingredient | 1 | 2 | 3 | 4 | 5 | 6 | 7 | 8 | 9 |
| Des W | 3.58 | 3.62 | 3.28 | 3.27 | 5.46 | 5.48 | 5.01 | 4.99 | 2.42 |
| Polyol 06 | 0.89 | 1.70 | 0.82 | 0.82 | 3.28 | 3.30 | 3.01 | 3.00 | 3.23 |
| DBTDL | 0.002 | 0.002 | 0.002 | 0.002 | 0.004 | 0.004 | 0.004 | 0.004 | 0.003 |
| Polyol 02 | 37.44 | 37.41 | 37.58 | 37.55 | 35.71 | 35.76 | 35.97 | 36.12 | 36.93 |
| Calc Carb | 40.62 | 51.54 | 40.81 | 51.74 | 38.85 | 49.14 | 39.10 | 49.49 | 45.45 |
| Talc | 12.90 | 2.02 | 12.95 | 2.00 | 12.32 | 1.91 | 12.43 | 1.99 | 7.35 |
| 3A Sieves | 2.73 | 2.70 | 2.75 | 2.83 | 2.65 | 2.61 | 2.64 | 2.66 | 2.85 |
| IO Red | 1.75 | 1.78 | 1.78 | 1.74 | 1.68 | 1.76 | 1.80 | 1.72 | 1.74 |
| DBTDL | 0.08 | 0.04 | 0.03 | 0.04 | 0.05 | 0.04 | 0.03 | 0.04 | 0.03 |
| NCO (%) | 25.22 | 25.22 | 25.22 | 25.22 | 12.50 | 12.50 | 12.50 | 12.50 | 18.59 |
| NCO/OH | 1.15 | 1.16 | 1.05 | 1.04 | 1.15 | 1.15 | 1.05 | 1.04 | 1.08 |
| CalCarb/Talc | 40.6/12.9 | 51.5/2.0 | 40.8/13.0 | 51.7/2.0 | 38.8/12.3 | 49.1/1.9 | 39.1/12.4 | 49.5/2.0 | 45.4/7.4 |

Test results for gel time, Shore A and rebound are shown below in Table 2.4. All the results were analyzed with Design Expert, version 6.0.11. The results were relatively consistent and there were no statistically significant regression models. This indicated that changing the independent variables did not have a large effect on the resultant polymers and they were stable to formulation changes.

There are a few possible trends that are close to being statistically significant. For example, the NCO/OH index may influence gel time. Gel time may increase as the NCO/OH index increases.

Rebound trends higher as the percent NCO increases.

The changes in Shore A are small changes but it appears that Shore A values increase as NCO/OH increases, calcium carbonate/talc ratio increases and as the % NCO increases.

It was found that varying NCO %, NCO/OH and the calcium carbonate/talc ratio had little effect on polymer properties, and there may be some trends but they were not statistically significant.

TABLE 2.4

Test Results

| Run | Gel Time # (min) | Rebound* F-LBP-023 | Shore A* F-LBP-006 | Rebound** F-LBP-023 | Shore A** F-LBP-006 |
|---|---|---|---|---|---|
| 1 | 4 | 31.0 | 65.7 | 27.7 | 72.3 |
| 2 | 4 | 29.7 | 64.7 | 32.0 | 68.0 |
| 3 | 4 | 35.3 | 67.0 | 36.0 | 67.3 |
| 4 | 2.5 | 32.3 | 61.7 | 36.7 | 67.0 |
| 5 | 4.5 | 32.7 | 64.7 | 34.3 | 66.3 |
| 6 | 3 | 46.0 | 63.0 | 34.0 | 65.0 |
| 7 | 2 | 36.0 | 63.7 | 40.3 | 63.3 |
| 8 | 2.5 | 35.3 | 58.7 | 39.3 | 59.0 |
| 9 | 3 | 32.3 | 65.3 | 30.0 | 68.7 |

Determined when a string of polymer became self supporting
*After 72 hours at room temperature
**After additional 4 hours at 50° C.

Example 3

This example evaluated the effect of talc concentration on UV stability of urethane material to replace ethylene propylene diene terpolymer (EPDM).

Tests were conducted to determine the impact of various amounts of talc on the capability of the urethane formulation to retain its UV protecting properties. Several filler formulations containing various levels of talc were made and tested. A control sample was prepared that was absent of talc, and first, second and third test samples were prepared with 5.21% talc, 1.29% talc and 0.49% talc, respectively. The filler formulations were each added to the ethylene propylene diene terpolymer to produce first, second and third urethane samples, respectively.

The filler samples were tested by exposing the corresponding urethane samples containing the various levels of talc in a UV Weatherometer. UV radiation exposure was provided by UVB lamps with exposure maximized near 350 nm. The irradiance was held at 0.73 W/m², and the sample was held at 50° C.

The change in color of a sample during a period of time in the UV test chamber was measured with a colorimeter. This yielded a value identified as delta E* or $\Delta E^*$ that is defined by Equation 1.

$$\Delta E^* = ((\Delta L^*)^{0.5} + (\Delta a^*)^{0.5} + (\Delta b^*)^{0.5})^{0.5} \quad \text{EQ. 1}$$

L* is a function of the sample lightness
a* is a function of the sample red/green balance
b* is a function of the sample yellow/blue balance Values of $\Delta E^*$ were calculated for measurement on various green colored samples. The smaller/lower the value of $\Delta E^*$, the smaller/lower the color difference between the test sample and its un-UV exposed state.

Test results are shown in FIG. 1, which show there is a difference between the control sample with no talc and test samples containing various levels of talc. The control sample without talc clearly experienced more degradation from exposure to UV radiation than the samples containing talc. Each of the first, second and third test samples had lower $\Delta E^*$ values with increased UV exposure times as compared to the $\Delta E^*$ values of the control sample at the increased UV exposure times.

Example 4

Sample formulations 1-9 were made using aliphatic isocyanate as shown above in Table 2.3. A sample formulation was also made using methylene diphenyl isocyanate (MDI) as shown below in Table 3.1.

TABLE 3.1

MDI Material

| Ingredient | Percent |
|---|---|
| MI50 | 3.23 |
| Polyol 06 | 2.23 |
| DBTDL | 0.004 |
| Filler | |
| Polyol 02 | 37.03 |
| Calc Carb | 45.51 |
| Talc | 7.34 |
| 3A Sieves | 2.89 |
| IO Red | 1.75 |
| DBTDL | 0.01 |
| NCO/OH | 1.06 |

Testing was conducted at various times using UVA bulbs with the Atlas UV Test Weatherometer at an irradiance of 0.75 W/m² at 50° C. A slab of red EPDM was used as a control sample. Test samples included Formulations 1-8 shown in Table 2.3, and the MDI material shown in Table 3.1. The control sample and test samples were evaluated at 100 and 222 hours of exposure. One hundred hours correlates to 14 days of eight hour per day exposure, and 122 hours correlates to 32 days.

At 100 hours, the surface appearance of all samples was unchanged, i.e., no visible degradation. All samples showed color change after 100 hours. Colorimeter data at 100 hours exposure are shown below in Table 3.2 for Formulations 1-8, identified as MQ1-MQ8, respectively, and for the MDI material, identified as MQ MDI. Further, L*, A* and B* values, which indicate lightness, red/green coordinate, and yellow/blue coordinate, respectively, were recorded with a BYK Colorimeter prior to UV testing and after 100 hours. Table 3.3 shows delta E values for Formulations 1-8.

TABLE 3.2

Samples after 100 hours of 0.75 w/m² UV Exposure

| Sample | L* | A* | B* | $\Delta E_{(i-f)}$ |
|---|---|---|---|---|
| Standard EPDM | 39.39 | 28.58 | 21.5 | 1.6* |
| MQ 1 | 40.69 | 29.58 | 22.82 | 0.66** |
| MQ 2 | 38.95 | 29.2 | 22.07 | 1.17*** |
| MQ 3 | 37.84 | 29.29 | 22.61 | 1.22*** |
| MQ 4 | 39.39 | 30.15 | 23.29 | 0.62** |
| MQ 5 | 40.53 | 29.53 | 23.06 | 0.95** |

TABLE 3.2-continued

Samples after 100 hours of 0.75 w/m² UV Exposure

| Sample | L* | A* | B* | ΔE$_{(i-f)}$ |
|---|---|---|---|---|
| MQ 6 | 39.28 | 29.36 | 22.42 | 1.07** |
| MQ 7 | 39.25 | 28.54 | 21.87 | 1.57* |
| MQ 8 | 39.16 | 29.19 | 22.3 | 1.08** |
| MQ MDI | 44.54 | 34.76 | 29.3 | 9.20* |

*indicates red;

**indicates green; and

***indicates yellow

TABLE 3.3

| Run | NCO % | NCO/OH | Talc | ΔE$_{(i-f)}$ |
|---|---|---|---|---|
| 4 | 25.22 | 1.04 | 2 | 0.62 |
| 1 | 25.22 | 1.15 | 12.9 | 0.66 |
| 5 | 12.50 | 1.15 | 12.3 | 0.95 |
| 6 | 12.50 | 1.15 | 1.9 | 1.07 |
| 8 | 12.50 | 1.04 | 2 | 1.08 |
| 2 | 25.22 | 1.16 | 2 | 1.17 |
| 3 | 25.22 | 1.05 | 13 | 1.22 |
| 7 | 12.50 | 1.05 | 12.4 | 1.57 |

The delta E values indicate how closely the final sample matches the initial data for each of the samples. A delta E less than or equal to 1 is not perceptible by unaided human vision. Overall Formulations 4, 1, and 5 showed the least amount of change in color, respectively, with values all less than 1. Formulations 6 and 8 were less than 0.1 from the target value. All of the test samples had lower delta E's than the control EPDM sample, with the exception of the MDI material.

After a total of 222 hours UV exposure, the Formulations 1-8 did not show signs of degradation, however, the MDI sample had large surface cracks and was starting to flake. A description of the surface condition of Formulations 1-8 is shown in Table 3.4. The colorimeter could not be used to gather L*, A*, B* values after 222 hours due to stickiness of some of the samples.

TABLE 3.4

Effect of UV on Samples

| | Hours of UV Exposure | |
|---|---|---|
| Sample | 100 | 222 |
| 1 | No effect | 1 |
| 2 | No effect | 3 |
| 3 | No effect | 3 |
| 4 | No effect | 2 |
| 5 | No effect | 1 |
| 6 | No effect | 1 |
| 7 | No effect | 2 |
| 8 | No effect | 3 |

1 = no effect

2 = moderate stickiness

3 = sticky

Formulas and stickiness results tabulated in Tables 3.5-3.6 indicate that stickiness is affected by the NCO/OH index and the amount of NCO in the prepolymer.

TABLE 3.5

Sorting by NCO %

| Run | NCO % | NCO/OH | Talc | Stickiness |
|---|---|---|---|---|
| 1 | 25.22 | 1.15 | 12.9 | 1 |
| 2 | 25.22 | 1.16 | 2 | 3 |
| 3 | 25.22 | 1.05 | 13 | 3 |
| 4 | 25.22 | 1.04 | 2 | 2 |
| 5 | 12.50 | 1.15 | 12.3 | 1 |
| 6 | 12.50 | 1.15 | 1.9 | 1 |
| 7 | 12.50 | 1.05 | 12.4 | 2 |
| 8 | 12.50 | 1.04 | 2 | 3 |

1 = no effect

2 = moderate stickiness

3 = sticky

TABLE 3.6

Sorting by NCO/OH

| Run | NCO % | NCO/OH | Talc | Stickiness |
|---|---|---|---|---|
| 4 | 25.22 | 1.04 | 2 | 2 |
| 8 | 12.50 | 1.04 | 2 | 3 |
| 3 | 25.22 | 1.05 | 13 | 3 |
| 7 | 12.50 | 1.05 | 12.4 | 2 |
| 1 | 25.22 | 1.15 | 12.9 | 1 |
| 5 | 12.50 | 1.15 | 12.3 | 1 |
| 6 | 12.50 | 1.15 | 1.9 | 1 |
| 2 | 25.22 | 1.16 | 2 | 3 |

1 = no effect

2 = moderate stickiness

3 = sticky

TABLE 3.7

Sorting by Talc Level

| Run | NCO % | NCO/OH | Talc | Stickiness |
|---|---|---|---|---|
| 6 | 12.50 | 1.15 | 1.9 | 1 |
| 2 | 25.22 | 1.16 | 2 | 3 |
| 4 | 25.22 | 1.04 | 2 | 2 |
| 8 | 12.50 | 1.04 | 2 | 3 |
| 5 | 12.50 | 1.15 | 12.3 | 1 |
| 7 | 12.50 | 1.05 | 12.4 | 2 |
| 1 | 25.22 | 1.15 | 12.9 | 1 |
| 3 | 25.22 | 1.05 | 13 | 3 |

1 = no effect

2 = moderate stickiness

3 = sticky

After 100 hours of UV exposure, all of the MQ1-MQ8 Formulations had better resistance to color change than the original EPDM control sample. None of the samples had visible degradation after 100 hours of UV exposure (correlating to 14 days exposure). After 222 hours of UV exposure (correlating to 32 days exposure), the EPDM control sample showed no visible degradation.

We claim:

1. A highly filled[1] urethane system, comprising:
an isocyanate component;
a polyol component,
wherein a ratio of NCO/OH for the isocyanate and the polyol components is from about 1.04 to about 1.15; and
a filler component, comprising:
from about 76 percent to about 97 percent by weight of calcium carbonate based on total weight of the filler component; and
from about 3 percent to about 24 percent by weight of a mineral filler selected from the group consisting of talc, mica, and combinations thereof based on the total weight of the filler component, wherein the mineral filler, and optionally the calcium carbonate, is in the form of a composition comprising a polyol.

2. The urethane system of claim 1, wherein the filler component constitutes from greater than 0 to less than about 40% by weight of the urethane system.

3. The urethane system of claim 1, further comprising additives selected from the group consisting of catalyst, UV protection additive, colorant, pigment, antioxidant and mixtures thereof.

4. The urethane system of claim 1, wherein the isocyanate component is selected from the group consisting of isophorone diisocyanate, hexamethylene diisocyanate, methylenebis(phenyl diisocyanate), monomeric cycloaliphatic isocyanate, 4,4'-methylene dicyclohexyl diisocyanate, monomeric cycloaliphatic isocyanate, polymeric MDI, and mixtures and blends thereof.

5. The urethane system of claim 1, wherein the polyol component is selected from the group consisting of alkylene glycols, ethylene glycol, propylene glycol, 1,4-butane diol, 1,6 hexanediol, glycol ethers and polyethers, difunctional polyether polyols, diethylene glycol, triethylene glycol, dipropylene glycol, tripropylene glycol, glycerine, trimethylolpropane, tertiary amine-containing polyols, triethanolamine, triisopropanolamine, and ethylene oxide and/or propylene oxide adducts of ethylene diamine, toluene diamine, polyether polyols, carbonates, and mixtures and blends thereof.

6. The urethane system of claim 1, wherein percent NCO in the urethane system is from about 12.50 to about 25.22 percent.

7. The urethane system of claim 1, wherein said urethane system exhibits improved stability to UV exposure as compared to urethane systems that do not include the presence of the mineral filler.

* * * * *